United States Patent
Konias et al.

(10) Patent No.: US 8,684,041 B2
(45) Date of Patent: Apr. 1, 2014

(54) CONTROL VALVE FOR A DEVICE FOR VARIABLY ADJUSTING THE VALVE TIMING FOR GAS EXCHANGE VALVES IN AN INTERNAL COMBUSTION ENGINE

(75) Inventors: Stefan Konias, Nuremberg (DE); Jens Hoppe, Erlangen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1333 days.

(21) Appl. No.: 11/915,596

(22) PCT Filed: May 24, 2006

(86) PCT No.: PCT/EP2006/004936
§ 371 (c)(1),
(2), (4) Date: Nov. 27, 2007

(87) PCT Pub. No.: WO2006/136258
PCT Pub. Date: Dec. 28, 2006

(65) Prior Publication Data
US 2008/0271689 A1    Nov. 6, 2008

(30) Foreign Application Priority Data
Jun. 22, 2005 (DE) .......... 10 2005 028 757

(51) Int. Cl.
*F16K 15/16* (2006.01)
*F16K 15/14* (2006.01)

(52) U.S. Cl.
USPC .......... 137/853; 137/844; 137/852; 137/855; 137/625.68; 137/625.69

(58) Field of Classification Search
USPC ......... 137/625.2–625.27, 625.6–625.66, 853, 137/860, 846, 848, 859, 625.67, 625.68, 137/625.69, 843, 844, 852, 855, 856; 123/90.11, 90.15
See application file for complete search history.

(56) References Cited

U.S. PATENT DOCUMENTS

| | | | |
|---|---|---|---|
| 1,854,518 A | | 4/1932 | Little |
| 5,620,032 A | * | 4/1997 | Dame ................. 141/311 A |
| 6,899,126 B2 | * | 5/2005 | Weigand et al. ......... 137/512.15 |
| 2002/0129781 A1 | | 9/2002 | Kinugawa |
| 2005/0092371 A1 | * | 5/2005 | Delgado .................. 137/526 |
| 2006/0225791 A1 | * | 10/2006 | Patze et al. ............... 137/512.15 |

FOREIGN PATENT DOCUMENTS

| | | |
|---|---|---|
| DE | 943088 | 5/1956 |
| DE | 1021218 | 12/1957 |
| DE | 19853670 | 5/2000 |
| DE | 10143433 | 4/2003 |
| EP | 0840018 | 5/1998 |
| EP | 1447602 | 8/2004 |
| EP | 1291563 | 7/2006 |
| JP | 07229408 | 8/1995 |
| WO | 2004023010 | 3/2004 |

* cited by examiner

*Primary Examiner* — John Fox
*Assistant Examiner* — Kevin Murphy
(74) *Attorney, Agent, or Firm* — Volpe and Koenig, P.C.

(57) ABSTRACT

A control valve (14) for a device (1) for altering the valve timing for gas exchange valves (110, 111) of an internal combustion engine (100) is provided. A non-return valve (54) is located within an annular groove (44) formed on one of the components of the control valve (14) and pressurized medium flows through the annular groove. The assembly of the device is facilitated.

6 Claims, 7 Drawing Sheets

CONTROL VALVE FOR A DEVICE FOR VARIABLY ADJUSTING THE VALVE TIMING FOR GAS EXCHANGE VALVES IN AN INTERNAL COMBUSTION ENGINE

BACKGROUND

The invention relates to a control valve for a device for variably adjusting the valve timing for gas-exchange valves in an internal combustion engine and to a use of a non-return valve located in an annular groove for a pressurized medium circuit of a device for variably adjusting the valve timing for gas-exchange valves in an internal combustion engine.

In internal combustion engines, camshafts are used for actuating gas-exchange valves. Camshafts are mounted in the internal combustion engine such that cams mounted on these camshafts contact cam followers, for example, cup tappets, finger levers, or rocker levers. If a camshaft is set in rotation, then the cams roll on the cam followers, which in turn actuate the gas-exchange valves. Thus, both the opening period and also the opening amplitude, but also the opening and closing times of the gas-exchange valves, are set through the position and the shape of the cams.

During the actuation of the gas-exchange valves, the valve springs exert a force on the cams of the camshaft, by which alternating moments act on the camshaft.

Modern motor concepts look toward designing a variable valve train. On one hand, the valve stroke and valve opening period should be variable until the individual cylinder is completely shut down. For this purpose there are concepts, such as switchable cam followers or electro-hydraulic or electric valve actuators. Furthermore, it has been shown to be advantageous to be able to influence the opening and closing times of gas-exchange valves during the operation of the internal combustion engine. Here it is especially advantageous to be able to influence the opening or closing times of the intake or exhaust valves separately, in order to selectively adjust, for example, a defined valve overlap. By adjusting the opening or closing times of the gas-exchange valves as a function of the current characteristic diagram of the motor, for example, the current rotational speed or the current load, the specific fuel consumption can be reduced, the exhaust-gas behavior can be positively influenced, and the engine efficiency, the maximum torque, and the maximum output can be increased.

The described variability of the gas-exchange valve control times is achieved through a relative change of the phase position of the camshaft relative to the crankshaft. Here, the camshaft is usually in driven connection with the crankshaft via a chain, belt, or gear drive, or an identically acting drive concept. Between the chain, belt, or gear drive driven by the crankshaft and the camshaft there is a device for variably adjusting the valve timing of gas-exchange valves in an internal combustion engine, also called a camshaft adjuster below, which transfers the torque from the crankshaft to the camshaft. Here, this device is constructed so that during the operation of the internal combustion engine, the phase position between the crankshaft and the camshaft is maintained and, if desired, the camshaft can be rotated in a certain angular range relative to the crankshaft.

In internal combustion engines with a separate camshaft for the intake and the exhaust valves, each camshaft can be equipped with a camshaft adjuster. Therefore, the opening and closing times of the intake and exhaust gas-exchange valves can be shifted in time relative to each other and the valve overlap can be selectively adjusted.

The location of modern camshaft adjusters is usually on the drive-side end of the camshaft. The camshaft adjuster can also be arranged, however, on an intermediate shaft, a non-rotating component, or the crankshaft. It is composed of a driving wheel, which is driven by the crankshaft and which maintains a fixed phase relationship to the crankshaft, a driven element in driving connection with the camshaft, and an adjustment mechanism transferring the torque from the driving wheel to the driven element. The driving wheel can be constructed in the case of a camshaft adjuster not arranged on the crankshaft as a chain, belt, or gear wheel and is driven by the crankshaft via a chain, belt, or gear drive. The adjustment mechanism can be operated electrically, hydraulically, or pneumatically.

The so-called axial piston adjuster and the rotary piston adjuster represent two preferred embodiments of hydraulically adjustable camshaft adjusters.

For axial piston adjusters, the driving wheel is connected to a piston and this is connected to the driven element each via spiral gearing. The piston separates a hollow space formed by the driven element and the driving wheel into two pressure chambers arranged axial relative to each other. If one pressure chamber is now pressurized with a pressurized medium, while the other pressure chamber is connected to a tank, then the piston is displaced in the axial direction. The axial displacement of the piston is transferred by the spiral gearing into a relative rotation of the driving wheel to the driven element and thus of the camshaft to the crankshaft.

A second embodiment of a hydraulic camshaft adjuster is the so-called rotary piston adjuster. In these adjusters, the driving wheel is locked in rotation with a stator. The stator and the driven element (rotor) are arranged concentric to each other, wherein the rotor is connected with a non-positive fit, positive fit, or material fit, for example, using a press fit, a screw or weld connection, to a camshaft, an extension of the camshaft or an intermediate shaft. In the stator, several recesses spaced apart in the peripheral direction are formed, which extend radially outwardly starting from the rotor. The recesses are limited in the axial direction in a pressure-tight manner by side covers. A vane connected to the rotor extends into each of these recesses, wherein each recess is divided into two pressure chambers. Therefore, two groups of pressure chambers are formed. Through the selective connection of one group of pressure chambers to a pressurized medium pump and the other group of pressure chambers to a tank, the phase of the camshaft can be adjusted or maintained relative to the crankshaft. The vanes can be constructed, for example, in one part with the rotor or as separate components, which are arranged in an axial vane groove on the outer casing surface of the rotor and which are forced radially outward by a spring element.

For controlling the camshaft adjuster, sensors detect the characteristic data of the motor, such as, for example, the current phase position of the camshaft to the crankshaft, the load state, and the rotational speed. This data is fed to an electronic control unit, which controls the feeding and discharge of pressurized medium to the various pressure chambers after comparing the data with a characteristic diagram of the internal combustion engine.

To adjust the phase position of the camshaft relative to the crankshaft, in hydraulic camshaft adjusters one of the two oppositely acting pressure chambers are connected to a pressurized medium pump and the other is connected to the tank. The inflow of pressurized medium to a chamber in connection with the outflow of pressurized medium from the other chamber displaces the piston/vane separating the pressure chambers, wherein the camshaft is turned relative to the crankshaft in axial piston adjusters through an axial displacement of the piston by the spiral gearing. In rotary piston adjusters, through the pressurization of one group of pressure chambers and the relaxation of pressure in the other group of pressure chambers, the vane is displaced in the peripheral direction and thus the camshaft rotates relative to the crankshaft directly. To maintain the phase position, both pressure chambers are connected either to the pressurized medium pump or both are separated from the pressurized medium pump and also from the tank.

The control of the pressurized medium flows to or from the pressure chambers is performed by a control valve, usually a 4/3 proportional valve. This is comprised essentially from a hollow cylindrical valve housing, a control piston, and an adjustment unit. Each valve housing is provided with a connection for each group of identically acting pressure chambers (work connection), a connection to the pressurized medium pump, and at least one connection to a tank. These connections are usually constructed as annular grooves on the outer casing surface of the valve housing, which communicate with the interior of the control piston via radial openings. Within the valve housing, the control piston is arranged so that it can be displaced in the axial direction. The control piston can be positioned by the adjustment unit, which is usually actuated electromagnetically or hydraulically, against the spring force of a spring element in any position in the axial direction between two defined end positions. The outer casing surface of the control piston is essentially adapted to the inner diameter of the valve housing and is provided with annular grooves and control edges. Through control of the adjustment unit, the individual connections can be connected hydraulically to each other, wherein the individual pressure chambers can be connected selectively to the pressurized medium pump or to the tank. Likewise, a position of the control piston can be provided, in which the pressurized medium chambers are separated both from the pressurized medium pump and also from the pressurized medium tank.

Such a control valve is known from JP 07-229408A. In this case, five annular grooves spaced apart from each other are constructed on the outer casing surface of the valve housing, wherein each of the annular grooves is used as a connection of the valve. In each groove base of the annular grooves, a radial opening is formed, which opens into the interior of the valve housing. Here, openings of adjacent groove bases are offset relative to each other in the peripheral direction by 180°.

Within the valve housing there is a solid control piston, which can be positioned by an electromagnetic adjustment unit against the force of a spring within the valve housing in the axial direction between two end stops. The outer diameter of the control piston is adapted to the inner diameter of the valve housing. In addition, three annular grooves are formed on the control piston, by, dependent on the position of the control piston relative to the valve housing, adjacent connections can be connected to each other.

From DE 198 53 670 A1, another embodiment of such a control valve is known. This differs from the embodiment shown in JP 07-229408A in that the control piston has a hollow construction. In addition, on the outer casing surface of the valve housing, only three connections are formed, wherein a fourth connection is constructed in the axial direction of the valve housing. The pressurized medium can now be led to one of the two work connections via the axial inlet connection according to the position of the control piston relative to the valve housing. Simultaneously, the other work connection is connected to the tank connection via an annular groove formed on the outer casing surface of the control piston.

In this embodiment of a control valve, the position of the inlet connection and the tank connection are exchangeable.

By rolling the cam of a camshaft on the cam follower of a valve train, periodically alternating moments act on the camshaft. These alternating moments are transferred to the rotor of the camshaft adjuster, wherein pressure spikes are produced in the pressure chambers. To prevent these pressure spikes from being transferred via pressurized medium lines and the control valve into the pressurized medium circuit of the internal combustion engine, non-return valves are provided between the control valve and the pressurized medium pump. Here, non-return valves that are separate or that are integrated into the control valve can be provided. A non-return valve integrated in the control valve is shown, for example, in EP 1 291 563 A2. In this embodiment, a closing element made from a band bent into a ring is arranged within an annular groove formed on a valve housing. The annular groove is limited in the radial direction by a sleeve. Openings, through which the pressurized medium can reach into the interior of the valve housing, are formed both in the sleeve and also in the groove base of the annular groove. In addition, the band is made from spring steel and is pretensioned outwardly in the radial direction.

If the pressure in the interior of the valve housing exceeds the pressure of the pressurized medium arising at the opening of the sleeve, then the band contacts the inner casing surface of the sleeve and thus prevents the pressurized medium flow from the interior of the valve housing to the opening of the sleeve. In the reverse case, the band is forced inward by the pressurized medium arising at the opening of the sleeve, wherein pressurized medium can be guided from the opening of the sleeve into the interior of the valve housing.

This installation-space saving variant of a non-return valve has the disadvantage that the assembly in a surrounding construction is very complicated and subject to errors due to the radially outward directed pretensioning of the band. Because the annular grooves must be sealed relative to the surrounding construction in the mounted state, the outer diameter of the valve housing is adapted to the inner diameter of the surrounding construction and the valve housing is integrated by means of a clearance fit in the surrounding construction. Here, the radially outwardly pretensioned band has the tendency to expand outward, wherein this projects from the annular groove. During assembly, this band could be damaged or could become jammed between the surrounding construction and the valve housing. Therefore, the functional security of the non-return valve or even the entire control valve comes into question.

In an alternative embodiment, the band forming the closing body is arranged within an annular groove, which is formed on the inner casing surface of the valve housing. Here, the band is pretensioned outward in the radial direction. For a flow of pressurized medium into the valve housing, it is bent radially inward, while it otherwise contacts the groove base of the annular groove and thus blocks the outward flow of pressurized medium. In this embodiment, the complicated assembly of the closing body has a disadvantageous effect. Furthermore, there is the risk that the band will move into the region of the control piston arranged displaceably within the valve housing and thus prevents its positioning.

SUMMARY

The invention is therefore based on the objective of avoiding these mentioned disadvantages and thus creating a control valve for a device for variably adjusting the valve timing of gas-exchange valves in an internal combustion engine, wherein a non-return valve integrated in the pressurized medium circuit of the camshaft adjuster or on or in the control valve is provided. In this way, it should be guaranteed that this is not damaged during assembly or that the function of the control valve is not negatively affected. In addition, the assembly expense of the control valve and thus its production costs should not be increased.

In a first embodiment of a control valve for a device for variably adjusting the valve timing of gas-exchange valves in an internal combustion engine with a valve housing, which is arranged within a surrounding construction, with a control piston, which is arranged within the valve housing, wherein on at least one of the two components, a groove extending in the peripheral direction of this component is formed, with pressurized medium flowing through this groove, with a closing body arranged in the groove, and with at least one opening formed in the valve housing and the surrounding construction, by which the groove communicates with a pressurized medium line, wherein the closing body and the opening interact as a non-return valve, the object according to the invention is met in that the non-return valve has no spring element forcing the closing body in the direction of the opening.

In this way, it can be provided that the closing body is to be moved during the closing process of the non-return valve exclusively through the flow of pressurized medium to the opening.

Several annular grooves, which are spaced apart from each other in the axial direction and which communicate with the interior of the valve housing via openings formed in the groove base, are constructed on an outer casing surface of the valve housing. In the assembled state of the control valve, these annular grooves are limited radially outwardly by a surrounding construction, for example, a camshaft, a wall of a cylinder head, or a sleeve. In the wall of the surrounding construction limiting the annular grooves, for each annular groove there is an opening, which connects each annular groove to a pressurized medium line. Furthermore, in the groove bases of the annular grooves, similar openings are provided, by which the annular grooves communicate with the interior of the valve housing. Thus, pressurized medium can be led from a pressurized medium pump into the interior of the valve housing via the annular groove used as an inlet connection. In addition, pressurized medium can be led to the various groups of identically acting pressure chambers of the camshaft adjuster via the other annular grooves.

To prevent that the pressure spikes produced in the pressure chambers of the camshaft adjuster are led into the pressurized medium circuit of the internal combustion engine via the inlet connection, within the annular groove, which is used as an inlet connection, there is a non-return valve. The non-return valve is comprised of a rigid closing body, which is arranged displaceably in the radial direction of the valve housing and the opening in the wall of the surrounding construction, which is used as a valve seat. If the system pressure established by the pressurized medium pump exceeds the pressure prevailing within the valve housing, then the closing body moves radially inward and thus releases the pressurized medium flow form the opening in the surrounding construction to the interior of the valve housing. In this way, the closing body moves without the restoring force of a spring in a radial direction until this body comes into contact on the groove base of the annular groove.

If a pressurized medium flow is established in the opposite direction, then the pressurized medium flows to the rear side of the closing body, wherein this body is forced outward in the radial direction against the valve seat. In this way, the opening and the closing body are constructed such that the closing body in this case contacts the opening, so that a flow of pressurized medium from the valve housing into the pressurized medium line is blocked.

Alternatively, it is also possible to arrange the closing body within an annular groove formed on the control piston, with this groove being connected directly to the inlet connection. In this case, only one opening is formed in the groove base of the annular groove used as an inlet connection. The construction of several closely adjacent openings, which are constructed in a limited surface interval, is also possible.

The arrangement of the non-return valve in an annular groove of the control valve is associated with, among other things, the advantage that this is arranged at the shortest possible distance to the production location of the pressure spikes. A more rigid hydraulic support is produced from this. In addition, no additional installation space is needed for a separate non-return valve. By constructing the non-return valve with a closing element, which is not actuated by a spring element, its assembly is considerably simplified. The closing element is positioned within the annular groove and then the components are added. There is no risk of the closing body jumping out. The flow-actuated construction of the non-return valve further permits a simple and cost-effective setup and the original design of the control valve can be maintained.

In one advantageous improvement of the invention, it is provided that at least one guide element, which interacts with at least one guide surface formed on the component with the groove, is formed on the closing body. Furthermore, it can be provided to construct the closing body and the component with the groove such that the closing body can be mounted only in the provided orientation.

To guarantee that the closing body is oriented at any time in the radial direction towards the opening and that a movement of the closing body can be performed only in this direction, at least one guide element is formed on the closing body. This/these guide element/s interacts/interact with the valve housing and prevents/prevent rotation of the closing body within the annular groove.

This guiding function can be realized, for example, by constructing two guide connecting pieces, wherein the guide connecting pieces and the closing body have a U-shaped construction and contact the guide connecting pieces on the opposite sides of the groove base. In this embodiment, each groove base is advantageously provided with a flattened section in the regions, at which the guide connecting pieces contact. Through this construction of the closing body and the valve housing, a position allocation of the closing body relative to the valve seat is achieved, first, in a functionally reliable way and the risk of incorrect orientation of the closing body during assembly is minimized.

In addition, if the two flattened sections of the annular groove of the valve housing are not parallel, but instead constructed at a certain angle greater than zero relative to each other and simultaneously the guide connecting pieces are adapted to this shape, it is achieved that the closing body can be mounted only in one, the correct, orientation and thus the functional security of the non-return valve is guaranteed.

Another possibility of the construction of a guide element on the closing body consists in providing, for example, a peg, which is formed centrally on a blocking element of the closing element and which engages in one of the openings in the groove base of the annular groove.

Advantageously, retaining elements, which hold the closing body within the groove, are formed on the closing body.

Through the construction of retaining elements on the closing body or its guide elements, the closing body is secured captively before the assembly of the control valve. Such retaining elements can be constructed, for example, as catch projections on the guide connecting pieces, wherein the catch projections engage at least partially around the valve housing on the side facing away from the closing body. In the case of the centrally arranged peg, the retaining elements can be constructed as a bead surrounding its end facing away from the blocking element.

Through the formation of the retaining elements, the closing body is secured, first, captively during the assembly of the valve and during transport. Second, for a suitable formation of the retaining elements, it is prevented that the closing body extends past the annular groove during the assembly of the valve in the surrounding construction.

Through the integration of the non-return valve in the control valve and securing the closing body within the annular groove, no additional expenses are incurred during the final assembly.

In another embodiment of a control valve for a device for variably adjusting the valve timing of gas-exchange valves in an internal combustion engine with a valve housing, which is arranged within a surrounding construction, with a control piston, which is arranged within the valve housing, wherein on the valve housing an annular groove extending in its peripheral direction is formed, with pressurized medium flowing through this groove, and with a non-return valve arranged in the annular groove with at least one flexibly constructed closing body, the objective according to the invention is met in that the non-return valve further has a frame adapted to the shape of the annular groove, in which one end of the one or more closing bodies is held and furthermore has available at least one stop, which limits the closing movement of the closing body.

In this embodiment, an annular frame comprised of a rigid, only slightly bendable material is arranged within an annular groove of the control valve, which is used as an inlet connection. In this way, the axial extent of the frame is adapted to the axial extent of the annular groove. The frame is constructed so that at least one recess, through which pressurized medium can be led from the opening in the surrounding construction into the annular groove, is provided between two annular sections, which are formed on the axial ends of the frame. If several recesses are provided then these are separated from each other essentially by axial supports.

Within the frame there is at least one flexible closing element, which is held on one end by the frame and whose dimensions are selected so that it can cover the entire surface of the recess(es). The frame is advantageously composed of a plastic and can be produced, for example, in an injection molding process. In this case, the connection between the closing body and the frame can be realized through partially injection molding of the closing body during the production process of the frame. Alternatively, by forming positive-fit elements, a positive-fit connection between the two components can be provided.

If the system pressure provided by the pressurized medium pump exceeds the pressure within the valve housing, then the flexible closing body is bent radially inward. In this way, it releases the path for the pressurized medium, which now can penetrate from the outside into the annular groove and can be guided to the device. For a reversed pressurized medium flow, the flexible closing body is forced radially outward until it contacts the frame and/or the supports. This closing movement can also be supported in that the closing body is produced from an elastic material.

The advantage of this embodiment lies in that the non-return valve can be easily assembled in the annular groove and is held captively in the annular groove after assembly. The non-return valve advantageously has an annular construction, with two open ends that are opposite each other in the peripheral direction and that can be connected to each other by a clip connection or similar connection methods. Another advantage consists in that neither the frame nor the closing body project past the edge of the annular groove, which guarantees a simpler and more functionally reliable assembly of the control piston in the valve housing or assembly of the valve housing in the surrounding construction.

In an advantageous improvement of the invention, it is provided that the closing body is made from a band bent into a ring and extends in the peripheral direction, wherein an axial, annular end of the closing body is held in the frame. The band in an advantageous embodiment is made from a silicon sealing lip, which is injection molded directly into the frame by means of a 2-component injection molding process.

The flow of pressurized medium through the non-return valve can be increased in that several recesses spaced apart in the peripheral direction are formed on the frame. In this case, the closing body is constructed as a band bent into a ring, wherein an axial end of the annular band is held in the frame. Adjacent recesses of the frame are separated from each other by axial supports, which are simultaneously used for limiting the path of the closing body outward in the radial direction.

Furthermore, two closing bodies can be provided, which are offset from each other in the axial direction, wherein one end of each closing body is held in the frame and wherein these ends involve the ends facing away from the other closing body. In this case, it can be provided to arrange and construct the two closing bodies such that they overlap in the axial direction in the blocked state of the non-return valve.

Through the use of two closing bodies, which are arranged such that these at least partially overlap in the closed state, turbulence when the pressurized medium is flowing and thus the hydraulic resistance can be reduced. Through the overlap of the closing bodies in the closed state, an annular contact surface of the closing bodies on each other is formed, which increases the effectiveness of the non-return valve.

To prevent the flexible closing bodies from being able to be pressed outwardly through the recesses in the closed state due to the pressure prevailing in the interior of the control valve, it can be provided that the flexible closing bodies are provided with reinforcement elements. These reinforcement elements advantageously extend in the axial direction or peripheral direction of the closing body, wherein their opening movement is not obstructed for an extent in the peripheral direction.

Advantageously, the frame is constructed with two annular elements, which extend in the peripheral direction and which are connected to each other by several, essentially axially extending supports spaced apart in the peripheral direction, wherein a filter cloth extends between the annular elements. By integrating a filtering function in the non-return valve, contaminating particles in the pressurized medium can be held back, which could lead to the failure of the control valve.

Furthermore, a use of a non-return valve arranged in an annular groove for a pressurized medium circuit of a device for variably adjusting the valve timing of gas-exchange valves in an internal combustion engine is proposed with a closing body and a valve seat, wherein the objective is met according to the invention in that the closing body is to be moved onto the valve seat during the closing process only by the flow of pressurized medium.

In another use of a non-return valve arranged in an annular groove for a pressurized medium circuit of a device for variably adjusting the valve timing of gas-exchange valves in an internal combustion engine with at least one flexible closing body, the objective is met according to the invention in that the non-return valve further has a frame, in which one end of the one or more closing bodies is held and furthermore there is at least one stop that limits the closing movement of the closing body.

Here, the non-return valve can be arranged, for example, in a rotating feedthrough for pressurized medium between a camshaft and a bearing bridge of the camshaft or in an annular groove of a control valve.

Through the use of a non-return valve arranged in an annular groove for a pressurized medium circuit of a device for variably adjusting the valve timing of gas-exchange valves in an internal combustion engine according to one of the illustrated construction types, the non-return valve can be integrated in the internal combustion engine at many different locations of the pressurized medium circuit, without requiring additional installation space. Here, the non-return valve can be arranged, for example, in an annular groove of the control valve or, in the case of a central control valve arranged within the device, in a rotating feedthrough for pressurized medium, by means of which pressurized medium is led to the inlet connection of the control valve. Here, it can involve a rotating feedthrough for pressurized medium between a camshaft and a bearing bridge of the camshaft.

The construction of the non-return valve also guarantees a simple and functionally reliable assembly.

BRIEF DESCRIPTION OF THE DRAWINGS

Additional features of the invention emerge from the following description and from the drawings, in which embodiments of the invention are shown simplified. Shown are.

DETAILED DESCRIPTION OF THE PREFERRED EMBODIMENTS

Figure 1:
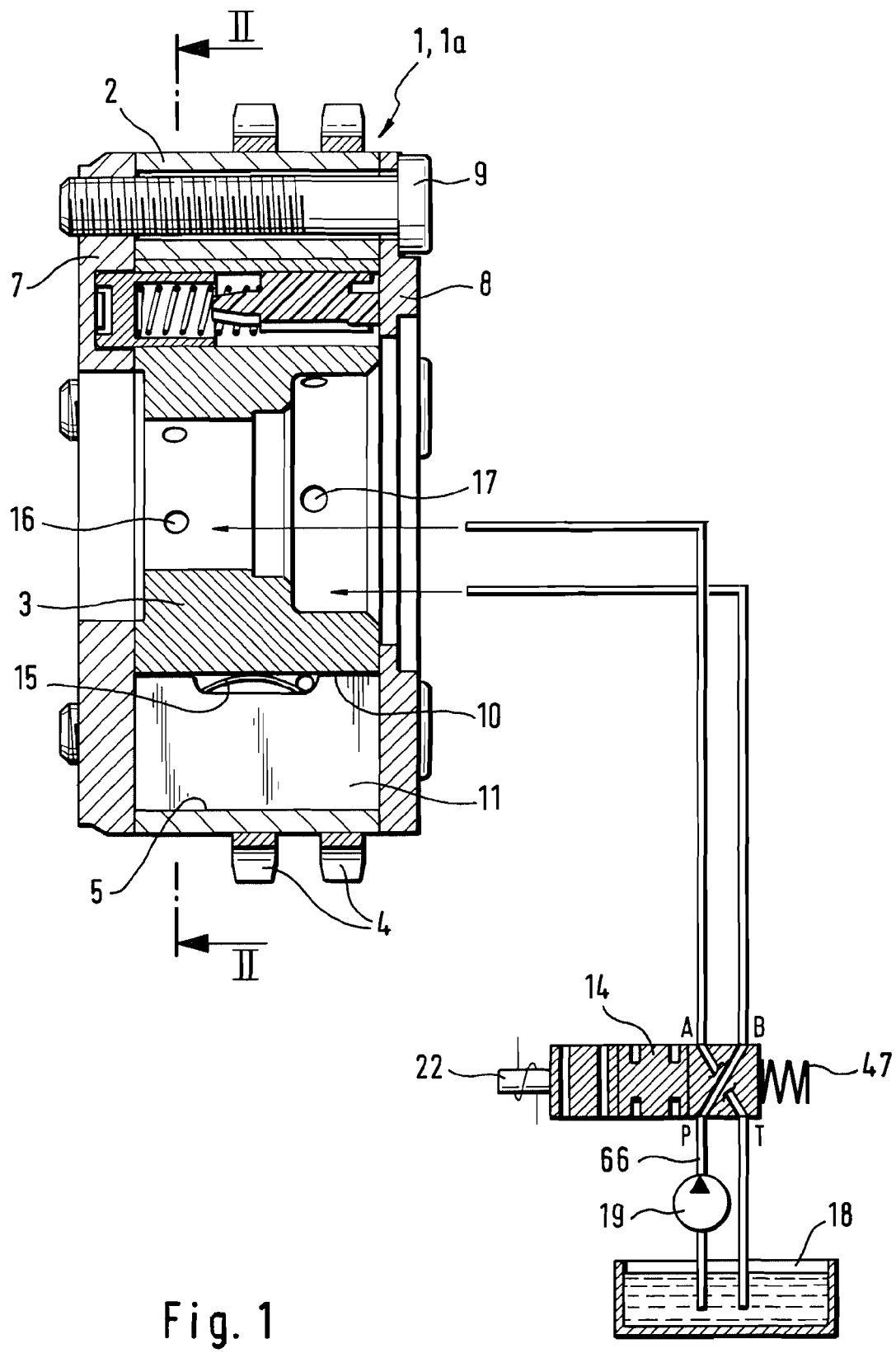
FIG. 1 a longitudinal sectional view through a device for altering the valve timing of an internal combustion engine with a pressurized medium circuit, FIG. 2 a cross sectional view through the device shown in FIG. 1 along the line II-II, FIG. 3 a longitudinal sectional view through a control valve, FIG. 4 a perspective view of a first embodiment of a control valve according to the invention, FIG. 5 a perspective view of the closing body from FIG. 4, FIG. 6a a cross sectional view through the control valve according to the invention from FIG. 4 in the region of the inlet connection, which is arranged in a surrounding construction, FIG. 6b a cross sectional view analogous to FIG. 6a, FIG. 7a a cross sectional view through the control valve according to the invention analogous to FIG. 6a with a modified closing body, FIG. 7b a cross sectional view through the control valve according to the invention analogous to FIG. 6b with another modified closing body, FIG. 8 a perspective view of a second embodiment of a control valve according to the invention, FIG. 9 a perspective, partially sectioned view of the non-return valve according to FIG. 8.
Figure 1A:
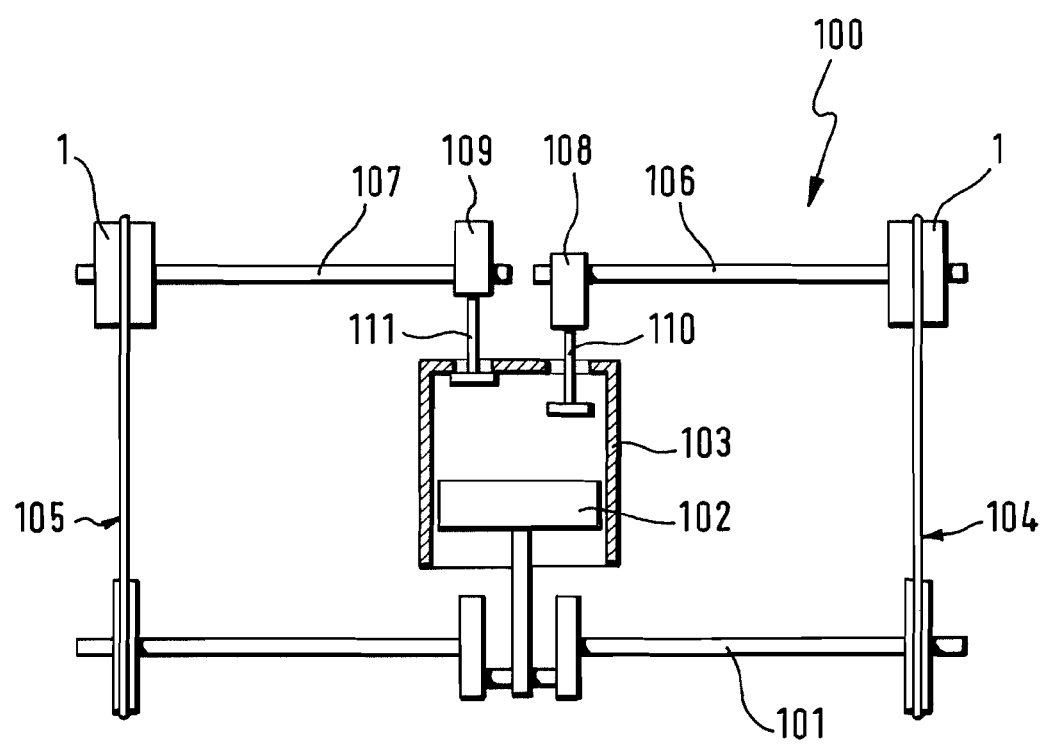
FIG. 1a only very schematically an internal combustion engine.

In FIG. 1a an internal combustion engine 100 is sketched, wherein a piston 102 sitting on a crankshaft 101 is shown in a cylinder 103. In the illustrated embodiment, the crankshaft 101 is connected to an intake camshaft 106 or an exhaust camshaft 107 via a traction element drive 104 and 105, respectively, wherein a first and a second device 1 can variably adjust the valve timing of gas-exchange valves 110, 111 for a relative rotation between the crankshaft 101 and camshafts 106, 107. Cams 108, 109 of the camshafts 106, 107 actuate an intake gas-exchange valve 110 or an exhaust gas-exchange valve 111. It can be similarly provided to equip only one of the camshafts 106, 107 with a device 1 or to provide only one camshaft 106, 107 that is provided with a device 1.

Figure 2:
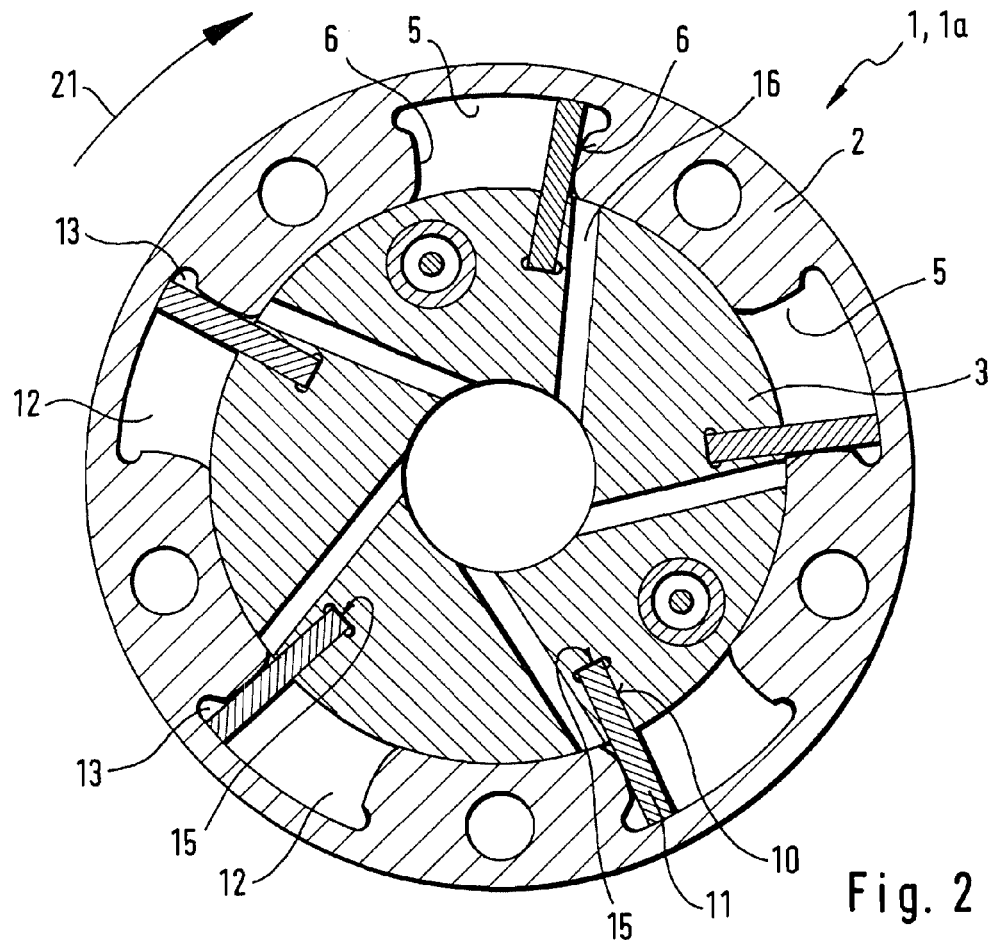

The FIGS. 1 and 2 show a hydraulic adjustment device 1 of a device 1 for variably adjusting the valve timing of gas-exchange valves 110, 111 in an internal combustion engine 100. The adjustment device 1a is essentially comprised of a stator 2 and a rotor 3 arranged concentric to this stator. A driving wheel 4 is locked in rotation with the stator 2 and constructed as a chain wheel in the shown embodiment. Also conceivable are embodiments of the driving wheel 4 as a belt or gear wheel. The stator 2 is supported so that it can rotate on the rotor 3, wherein five recesses 5 spaced apart in the peripheral direction are provided on the inner casing surface of the stator 2 in the shown embodiment. The recesses 5 are limited in the radial direction by the stator 2 and the rotor 3, in the peripheral direction by two side walls 6 of the stator 2, and in the axial direction by a first and a second side cover 7, 8. Each of the recesses 5 is closed pressure tight in this manner. The first and the second side cover 7, 8 are connected to the stator 2 by connection elements 9, for example, screws.

On the outer casing surface of the rotor 3 there are axial vane grooves 10, wherein a radially extending vane 11 is arranged in each vane groove 10. A vane 11 extends in each recess 5, wherein the vane 11 contacts the stator 2 in the radial direction and the side covers 7, 8 in the axial direction. Each vane 11 divides a recess 5 into two pressure chambers 12, 13 operating against each other. To guarantee a pressure-tight contact of the vane 11 on the stator 2, in the vane grooves 10 there are leaf-spring elements 15, which apply a force on the vane 11 in the radial direction.

Through first and second pressurized medium lines 16, 17, the first and second pressure chambers 12, 13 can be connected to a pressurized medium pump 19 or a tank 18 via a control valve 14. In this way, a control drive is formed, which enables a relative rotation of the stator 2 relative to the rotor 3. The control valve 14 is provided with two work connections A, B, which communicate with the pressurized medium lines 16, 17 via pressurized medium channels. In addition, a tank T and an inlet connection P are provided. The control valve 14 is connected to a tank 18 via the tank connection T. The inlet connection P is connected to the pressurized medium pump 19 by a pressurized medium line 66. The control valve 14 can be set into several control positions, in which different connections A, B, P, T communicate with each other, by an adjustment unit 22. Here it is provided that either all of the first pressure chambers 12 are connected to the pressurized medium pump 19 and all of the second pressure chambers 13 are connected to the tank 18 or they have the exactly opposite configuration. If the first pressure chambers 12 are connected to the pressurized medium pump 19 and the second pressure chambers 13 are connected to the tank 18, then the first pressure chambers 12 expand at the cost of the second pressure chambers 13. This results in a displacement of the vane 11 in the peripheral direction, in the direction shown by the first arrow 21. By displacing the vane 11, the rotor 3 is rotated relative to the stator 2. This produces a phase shift between the camshaft 106, 107 and crankshaft 101. Through the selective inlet or outlet of pressurized medium into or out of the pressure chambers 12, 13, the valve timing of the gas-exchange valves 110, 111 of the internal combustion engine 100 can be selectively varied.

In addition, a control position is provided, in which both work connections A, B are connected either only to the inlet connection P or neither to the inlet connection P nor tot the tank connection T. In this control position of the control valve 14, the relative phase position of the rotor 3 to the stator is maintained. To prevent pressure spikes produced in the device 1 from reaching into the pressurized medium pump 19, a non-return valve is provided between this pump and the interior of the control valve 14, as still to be described.

Figure 3:
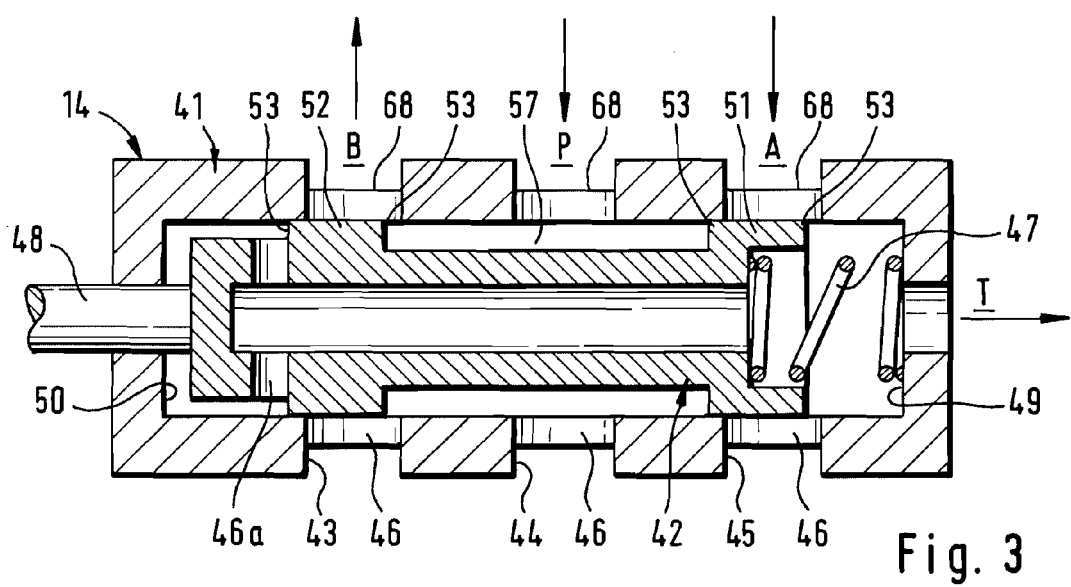

FIG. 3 shows schematically a longitudinal section through a control valve 14. The control valve 14 is composed of a valve housing 41 and a control piston 42. The valve housing 41 has an essentially hollow cylindrical construction, wherein three annular grooves 43, 44, 45 spaced apart in the axial direction are formed in its outer casing surface. Each of the annular grooves 43 to 45 represents a connection of the control valve 14, wherein the outer (first and third) annular grooves 43, 45 in the axial direction form the work connections A, B and the middle (second) annular groove 44 forms the inlet connection P. A tank connection T is constructed by an opening in one end of the valve housing 41. Each of the annular grooves 43 to 45 is connected to the interior of the valve housing 41 via first radial openings 46. An essentially hollow, cylindrical control piston 42 can be displaced axially within the valve housing 41. A force is applied to the control piston 42 on one end of a spring element 47 and on the opposite end face by a tappet push rod 48 of an adjustment unit 22. By activating the adjustment unit 22, the control piston 42 can be displaced against the force of the spring element 47 into any position between a first and a second end stop 49, 50.

The control piston 42 is provided with a first and a second annular connecting piece 51, 52. The outer diameters of the annular connecting pieces 51, 52 are adapted to the inner diameter of the valve housing 41. Between the annular connecting pieces 51, 52 there is a fourth annular groove 57 on the control piston 42. Furthermore, in the control piston 42 between its end, at which the tappet push rod 48 engages, and the second annular connecting piece 52, second radial openings 46a are formed, by which the interior of the control piston 42 is connected to the interior of the valve housing 41. The first and the second annular connecting piece 51, 52 are constructed and arranged on the outer casing surface of the control piston 42 such that control edges 53 release or block a connection between the inlet connection P and the work connections A, B via the fourth annular groove 57 as a function of the position of the control piston 42 relative to the valve housing 41. Simultaneously, a connection between the work connections A, B and the tank connection T is released or blocked.

By influencing the position of the control piston 42 within the valve housing 41, pressurized medium can be fed selectively to the first or the second pressure chambers 12, 13 and can be discharged from the other pressure chambers 12, 13, through which the phase position of the camshaft 106, 107 can be selectively altered relative to the crankshaft 101.

Figure 4:
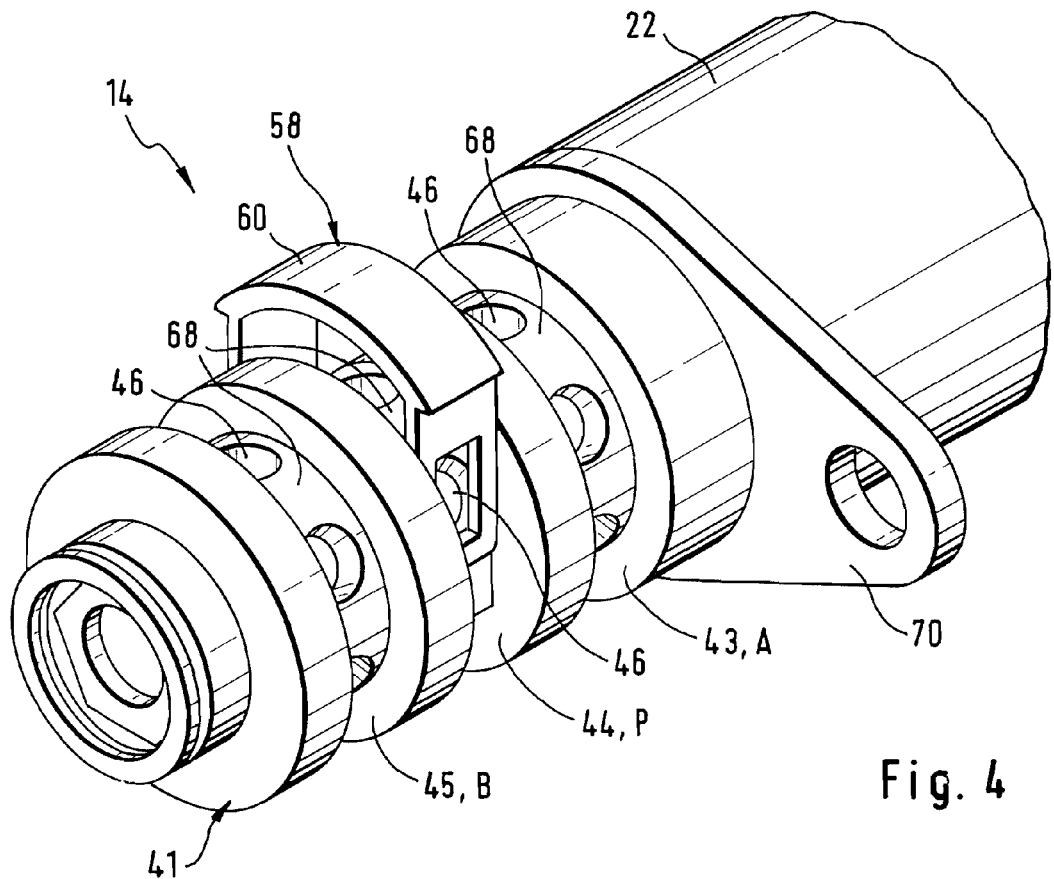

FIG. 4 shows a control valve 14 according to the invention in a perspective view. Shown are a valve housing 41, an adjustment unit 22, and a closing body 58 of a non-return valve 54. The closing body 58 is arranged in the second annular groove 44 and is comprised of a rigid, only slightly flexible material, for example, a plastic. Between the adjustment unit 22 and the valve housing 41 there is a mounting flange 70 with a borehole, by which the control valve 14 can be attached to a surrounding construction (not shown in this figure).

Figure 5:
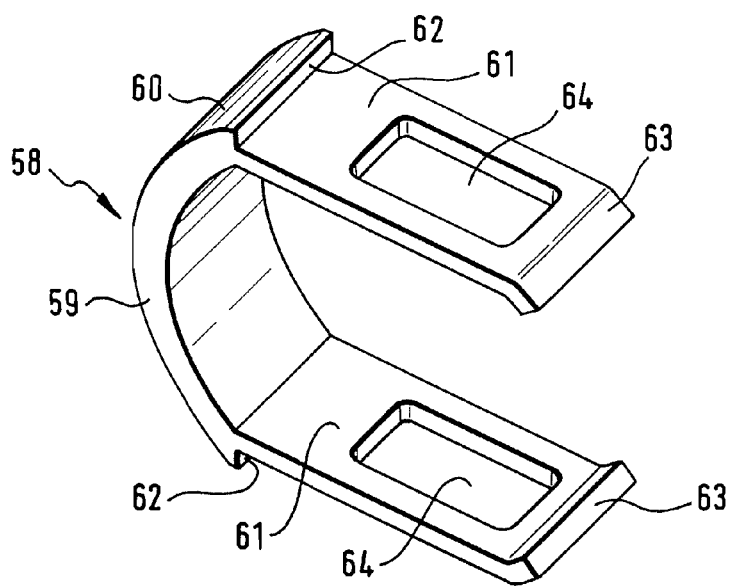

FIG. 5 shows a perspective view of the closing body 58. This is comprised of a blocking body 59 with a sealing surface 60 and guide elements 61, which are constructed in the shown embodiment as guide connecting pieces. In addition, contact flow surfaces 62, which project past the guide elements 61, are formed on the blocking body 59. Retaining elements and feedthrough openings 64 constructed as catch projections 63 are constructed on the guide elements 61.

Figure 6A:
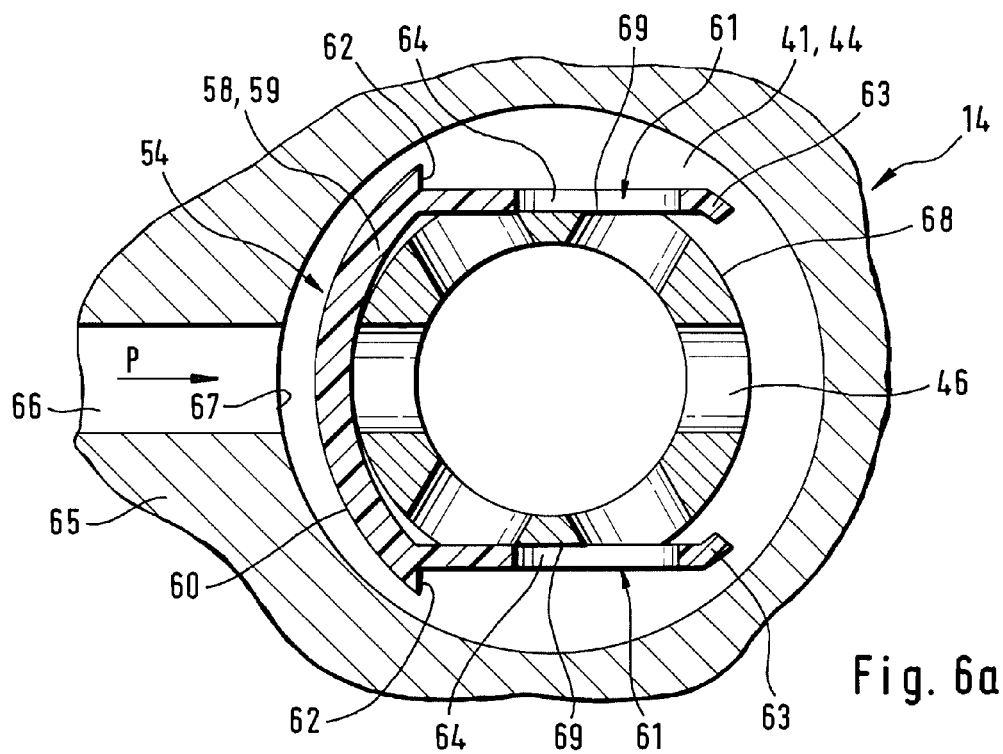
Figure 6B:
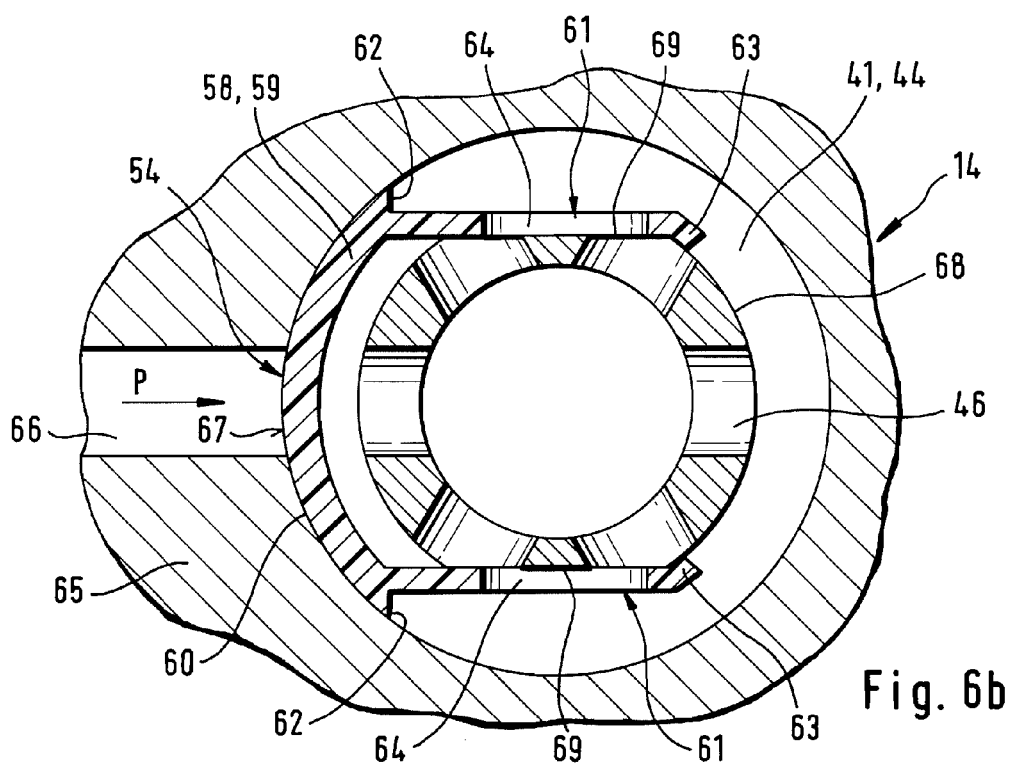

FIGS. 6a and 6b show a control valve 14 according to the invention analogous to that shown in FIG. 4 in cross section, wherein the section plane lies in the region of the inlet connection P. The control valve 14 is mounted in a surrounding construction 65 in this view. In the surrounding construction 65 there is a pressurized medium line 66, which connects the second annular groove 44 to a pressurized medium pump (not shown). The pressurized medium line 66 communicates with the second annular groove 44 via an opening 67 formed in the wall of the surrounding construction 65.

The closing body 58 is arranged in the second annular groove 44, such that the sealing surface 60 of the blocking body 59 is oriented in the direction of the opening 67.

The groove base 68 of the second annular groove 44 is provided with two flattened sections 69, wherein these are constructed so that the guide elements 61 constructed as guide connecting pieces contact the closing body in the assembled state of the closing body 58. The flattened sections 69 are thus used as guide surfaces for the closing body 58.

The flattened sections 69 are formed in a defined orientation to the borehole of the mounting flange 70. In this way, these sections satisfy, first, the function that the closing body 58 is mounted in the correct orientation relative to the opening 67 on the valve housing 41. The mounting flange 70 gives the orientation of the valve housing 41 within the surrounding construction 65 and the flattened sections 69 give the orientation of the blocking body 59 in the second annular groove 44.

In addition, the guide elements 61 take over a guiding function during the operation of the internal combustion engine 100, by which the closing body 58 can be moved only in the radial direction of the valve housing 41.

In FIG. 6a, the non-return valve 54 is shown in its open state. Pressurized medium, which enters into the second annular groove 44 via the opening 67, forces the blocking body 59 and thus the closing body 58 against the groove base 68 of the second annular groove 44. The pressurized medium can now reach into the interior of the valve housing 41 only via the second annular groove 44, the feedthrough openings 64, and the first radial openings 46.

For a reversed pressurized medium flow from the interior of the valve housing 41 in the direction of the opening 67, the pressurized medium enters at the rear side of the blocking body 59 and the contacts flow surfaces 62. In this way, the closing body 58, guided by the guide elements 61, is moved in the direction of the opening 67 until the closing body 58 contacts the wall of the surrounding construction 65. This blocked state of the non-return valve 54 is shown in FIG. 6b. In this state, the opening 67 is blocked by the blocking body 59 and pressure spikes generated in the device 1 cannot advance to the pressurized medium pump via the pressurized medium line 66.

In this state of the non-return valve 54, the catch projections 63 contact the groove base 68 of the second annular groove 44. During the transport of the control valve 14, these catch projections 63 thus act as a captive retaining device.

During assembly, the catch projections 63 further provide that the blocking body 59 does not project past the edge of the second annular groove 44. Thus it is guaranteed that the blocking body 59 is not damaged or even worn during the assembly of the control valve 14 in the surrounding construction 65 and does not cause the control valve 14 to become jammed in the surrounding construction 65.

Figure 7A:
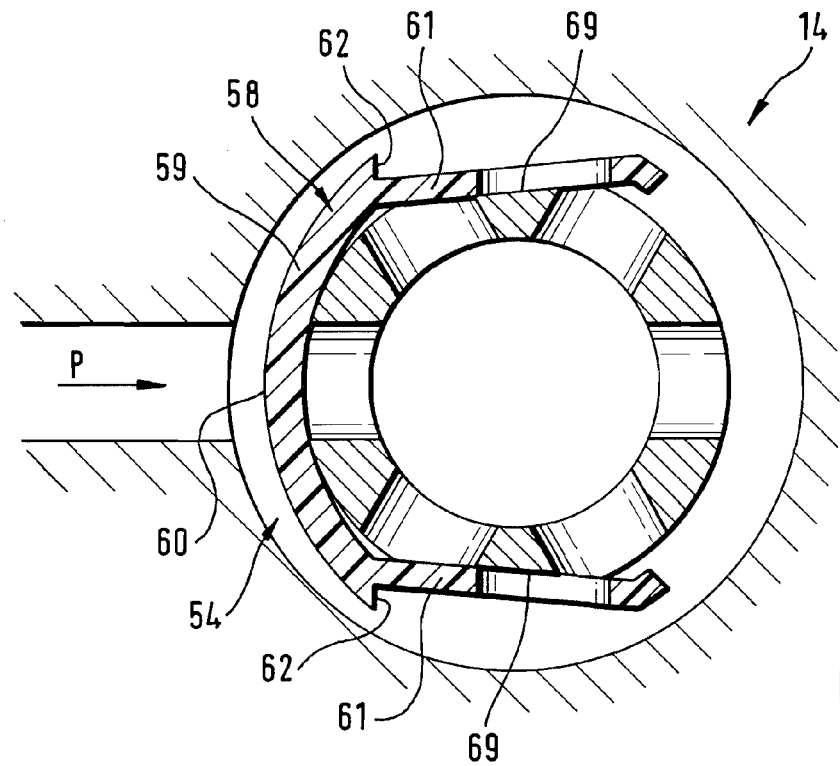

FIG. 7a shows a representation of a control valve 14 according to the invention analogous to FIG. 6a with a modified closing body 58. In contrast to the preceding embodiment, here the guide elements 61 constructed as guide connecting pieces and the corresponding flattened sections 69 are formed at a certain angle to each other. This has the advantage that the closing body 58 can be mounted only in one precise orientation in the second annular groove 44. Thus, incorrect orientation of the closing body 58 is ruled out.

Figure 7B:
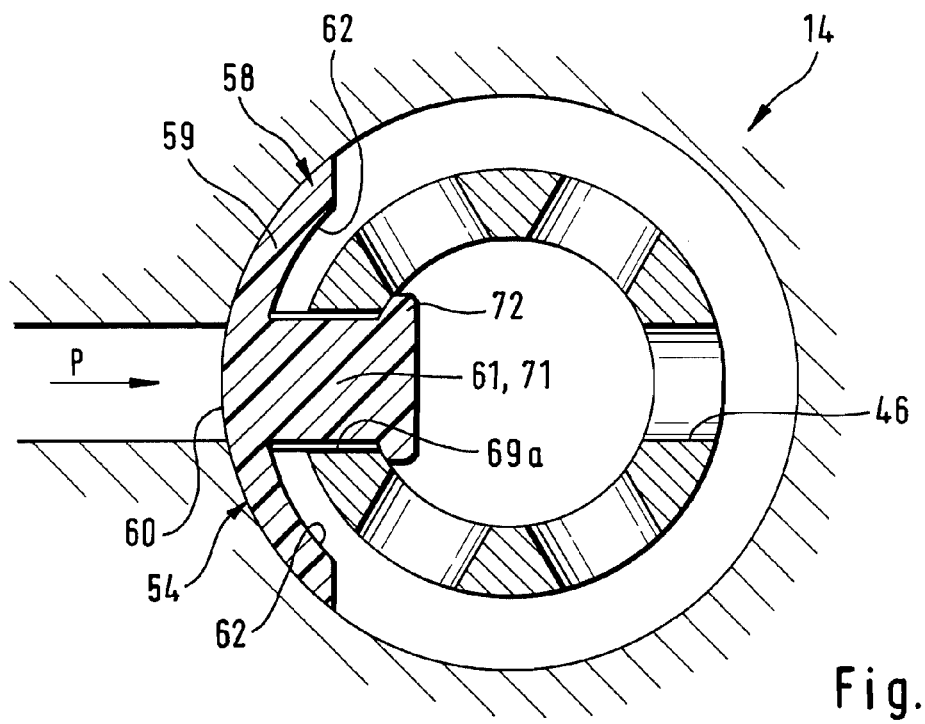

FIG. 7b shows another view of a control valve 14 according to the invention analogous to FIG. 6b with another modified closing body 58. The guide element 61 is constructed in this case as a peg 71, which is arranged centrally on the rear side of the blocking body 59. The peg 71 engages in one of the first radial openings 46 of the second annular groove 44. Here, an annular wall 69a of the radial opening 46 acts as a guide surface for the closing body 58. To guarantee the correct orientation of the closing body 58 during assembly, advantageously the radial openings 46 designed for guiding the closing body 58 are not larger than the remaining radial openings 46, and the peg 71 is adapted to the dimensions of the larger of the radial openings 46. To guarantee a secure closing of the non-return valve 54, the outer casing surface of the peg advantageously has a profiled construction. In this way, pressurized medium can flow through the radial opening 46 holding the peg 71 and can flow against the blocking body 59.

An annular, peripheral bead 72, which is used as a retaining element, is formed on the peg at the end of the peg 71 facing away from the blocking body 59.

In addition to the arrangement of the closing body 58 in the second annular groove 44 between the valve housing 41 and a surrounding construction 65, it is naturally also conceivable to arrange these within the fourth annular groove 57 between the control piston 42 and the valve housing 41. This can be realized, for example, in the embodiment of a control valve 14 shown in JP 07-229408.

Figure 8:
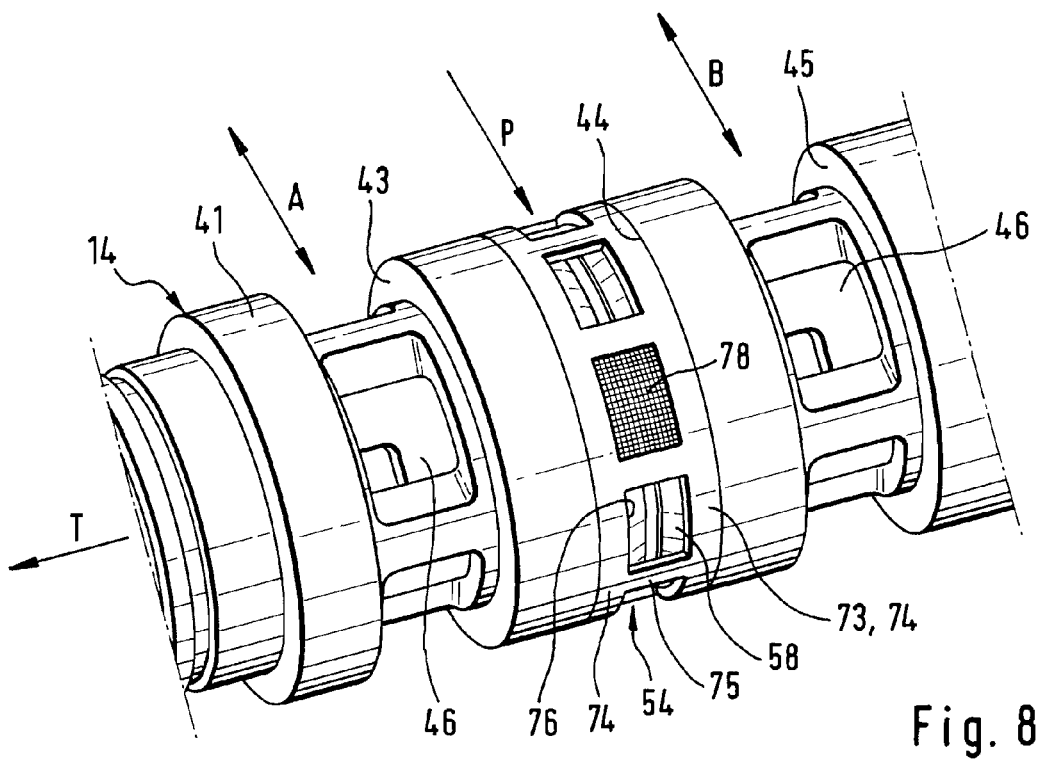
Figure 9:
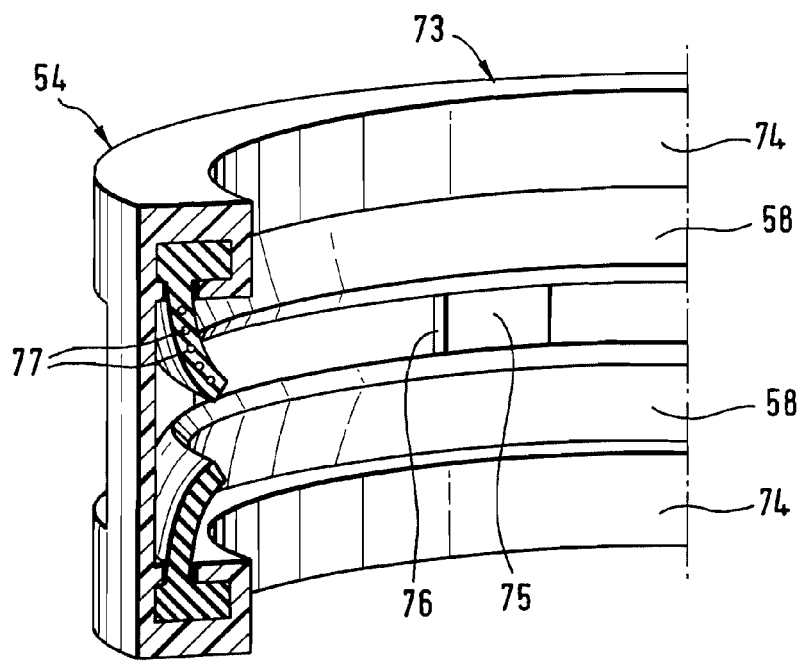

FIG. 8 shows another embodiment according to the invention for a control valve 14 with another variant of a non-return valve 54. FIG. 9 shows the non-return valve 54 in a perspective, partially sectioned view. The non-return valve 54 is composed of a rigid frame 73 and two flexible closing bodies 58.

The frame 73 has two annular sections 74, which are connected to each other via several supports 75. The supports 75 are separated from each other by several recesses 76 spaced apart in the peripheral direction. The extent of the frame 73 in the axial direction corresponds to the extent of the second annular groove 44. In this way it is guaranteed that the frame 73 contacts in a pressure-tight way against the annular surfaces limiting the second annular groove 44 and thus the pressurized medium can flow only via the recesses 76. In addition, the frame 73 extends in the peripheral direction along the entire second annular groove 44. In the radial direction within the supports 75 there are two flexible closing bodies 58. Each closing body 58 is constructed as a band bent into a ring, which runs along the entire inner peripheral surface of the frame 73. Each axial side of the closing body 58 is held in the frame 73 and is connected rigidly to this frame. As shown in the figure, this can be realized by a positive-fit connection, for example, by partial casting of the closing body 58 during the production of the frame 73. In an advantageous embodiment, the closing bodies 58 are constructed as silicon sealing lips, which are injection molded directly into the frame in a two-component injection molding process.

Below, the function of the non-return valve 54 will be explained. When pressurized medium flow into the interior of the control valve 14, the flexible closing bodies 58 are forced radially inwardly, which opens the recesses 76.

For a reversed flow of pressurized medium, the closing bodies 58 are forced against the supports 75, through which the closing bodies 58 contact each other and block the recesses 76.

In addition, reinforcement supports 77, which prevent the closing bodies 58 from being pressed through the recesses 76, can be provided in the closing bodies 58. These reinforcement supports 77 are advantageously oriented in the peripheral direction, so that they do not obstruct the opening of the closing body 58.

In this embodiment of a non-return valve 54, the recesses 76 can be provided with a filter cloth 78. This can be cast in the frame, for example, during the production of the frame 73. Therefore, the functions of a ring filter and that of a non-return valve 54 can be combined within one component. The filter cloth 78 is shown in FIG. 8 only in one of the recesses 76 for reasons of clarity. To fulfill the filter function, naturally it is provided in all of the recesses 76.

The construction of the non-return valve 54 according to one of the embodiments shown above has the advantage that these are arranged within an annular groove 44 of the control valve 14 and thus do not require additional installation space. The non-return valves 54 can be easily mounted, wherein it is guaranteed that the function of the non-return valves 54 is not negatively affected during the assembly of the control valve 14. In addition, all of the constructions are conceivable as plastic, injection molded parts with an integrated filter function.

REFERENCE SYMBOLS

1 Device
1a Adjustment device
2 Stator
3 Rotor
4 Driving wheel
5 Recesses
6 Side wall
7 First side cover
8 Second side cover
9 Connection element
10 Vane groove
11 Vane
12 First pressure chamber
13 Second pressure chamber
14 Control valve
15 Leaf-spring element
16 First pressurized medium line
17 Second pressurized medium line
18 Tank
19 Pressurized medium pump
21 Arrow
22 Adjustment unit
41 Valve housing
42 Control piston
43 First annular groove
44 Second annular groove
45 Third annular groove
46 First radial openings
46a Second radial openings
47 Spring element 48 Tappet push rod
49 First end stop
50 Second end stop
51 First annular connecting piece
52 Second annular connecting piece
53 Control edge
54 Non-return valve
57 Fourth annular groove
58 Closing body
59 Blocking body
60 Sealing surface
61 Guide element
62 Contact flow surfaces
63 Catch projection
64 Feedthrough opening
65 Surrounding construction
66 Pressurized medium line
67 Opening
68 Groove base
69 Flattened sections
69a Wall
70 Mounting flange
71 Peg
72 Bead
73 Frame
74 Annular section
75 Supports
76 Recesses
77 Reinforcement supports
78 Filter cloth
100 Internal combustion engine
101 Crankshaft
102 Piston
103 Cylinder
104 Traction mechanism drive
105 Traction mechanism drive
106 Inlet camshaft
107 Outlet camshaft
108 Cam
109 Cam
110 Intake gas-exchange valve
111 Exhaust gas-exchange valve
P Inlet connection
T Tank connection
A First work connection
B Second work connection

The invention claimed is:

1. Control valve for a device for variably adjusting the valve timing of gas-exchange valves in an internal combustion engine, comprising:
 a valve housing, which is arranged within a surrounding construction, a control piston, which is arranged within the valve housing,
 an annular groove, which extends in a peripheral direction of the valve housing, is formed on the valve housing, with pressurized medium flowing through the groove,
 a non-return valve arranged in the annular groove with two flexible annular closing bodies,
 the non-return valve further has an annular frame, which is adapted to a shape of the annular groove and in which one axial, annular end of each of the annular closing bodies is held with an opposite, free annular end of each of the closing bodies extending in an axial direction, and there are a plurality of stops comprising axial extending supports that are spaced apart by recesses, which limit a closing movement of the closing bodies, and
 the two closing bodies are arranged and constructed so that the free annular ends overlap in the axial direction in a blocked state of the non-return valve.

2. Control valve according to claim 1, wherein the closing body is made from a band bent into a ring shape and extends in the peripheral direction.

3. Control valve according to claim 1, wherein the at least one closing body comprises two closing bodies which are arranged offset relative to each other in the axial direction, wherein the one axial annular end of at least one of the two closing bodies that is held in the frame is the end facing away from the other closing body.

4. Control valve according to claim 1, wherein the frame is constructed with two annular elements, which extend in the peripheral direction and which are connected to each other by the supports which are spaced apart in the peripheral direction, wherein a filter cloth extends between the annular elements.

5. Control valve according to claim 1, wherein the flexible closing body is provided with reinforcement elements, which extend in the peripheral direction or in the axial direction.

6. Control valve according to claim 1, wherein the axial extent of the frame is adapted to an axial extent of the annular groove.

* * * * *